United States Patent Office 3,355,331
Patented Nov. 28, 1967

3,355,331
POLYMERIZATION-INHIBITED BUTADIENE AS A WELDING AND CUTTING TORCH FUEL
Marvin M. Johnson, Bartlesville, Okla., assignor to Phillips Petroleum Company, a corporation of Delaware
No Drawing. Filed Nov. 13, 1964, Ser. No. 411,122
6 Claims. (Cl. 148—9)

This invention relates to a welding and cutting torch fuel suitable as a substitute for acetylene. In one aspect, it relates to such a fuel which is not explosive like acetylene is, and will not polymerize to solid popcorn polymer before use as pure butadiene will, but which will have a high flame temperature in the vicinity of that of acetylene. In another aspect, it relates to a composition of matter comprising a mixture of butadiene with a butadiene popcorn polymer retarding amount of paraffins and/or olefins. In another aspect, it relates to a composition of matter consisting essentially of 85 to 95 percent by weight butadiene, from 5 to 15 percent $C_2$ to $C_4$ paraffins and/or olefins, and the remainder from 0 to 5 percent $C_2$ to $C_4$ acetylenes and/or propadiene, which composition is useful as a welding and cutting torch fuel, and to processes of using the same with a free oxygen-containing gas or with oxygen. In another aspect, it relates to adding dimerization or rubbery polymerization-inhibiting amounts (as distinguished from popcorn polymer inhibition) of from 5 to 500 parts per million of a butadiene rubbery polymerization inhibitor selected from the group consisting of t-butyl catechol, t-butyl hydroquinone, benzyl-p-aminophenol, tricresol, amyl-p-aminophenol, alpha-naphthol, alpha-naphthylamine, trimethylphosphine, triphenylphosphine, and nitric oxide.

In the prior art, the best available welding and cutting torch fuel was acetylene with a flame temperature of 3400 K. However, it is explosive and has been responsible for numerous fatal accidents. An attempt has been made to find a substitute gas; see "The Welding Journal," September 1955, pages 870–876, and "Proceedings of the 12th International Congress on Acetylene and Autogenous Welding," 6 (1959), pages 1459 and 1460. However, due to the well known property of pure butadiene to rapidly form solid popcorn polymers, it will be noted that butadiene was never even considered as a welding or cutting torch fuel. See "Industrial and Engineering Chemistry," July 1947, pages 826–837, on popcorn polymer, and the statement on page 827, column 2, last paragraph, that an effective inhibitor for rubbery polymerization has no effect on popcorn polymer growth in 98 percent or more butadiene.

The present inventor is the first to devise a way to use a blend of 85 to 95 percent butadiene successfully as a welding and cutting torch fuel without the formation of solid popcorn polymers by the discovery that from 5 to 15 percent $C_2$ to $C_4$ paraffins and/or olefins would substantially prevent the formation of butadiene popcorn polymer, and that any dimerization or rubbery polymer formation could be further inhibited by the additional butadiene rubbery polymerization inhibitors named in the second paragraph above, and thereby successfully attain a flame temperature close to that of pure butadiene, which is 3200 K., only 200 degrees Kelvin below that of pure acetylene, which is 3400 K. Also, by selecting the proportion of $C_2$ and $C_3$ paraffins and olefins present, a welding and cutting fuel is produced which will vaporize at temperatures below 70° F., which is the practical lower limit for the use of pure butadiene. For example, 5 weight percent of ethylene will give a tank pressure of 25 p.s.i.g. at 0° F. to butadiene containing the same.

One object of the present invention is to provide a composition of matter suitable for substitution for acetylene as a welding and cutting torch fuel, which is non-explosive but has a flame temperature in the vicinity of acetylene.

Another object is to provide an improved novel welding and cutting torch fuel.

Another object is to provide processes for using this novel fuel.

Another object is to provide a composition comprising butadiene which has a high flame temperature but will substantially not form solid popcorn polymers.

A further object is to also inhibit dimerization or rubbery polymer formation in such fuels.

Numerous other objects and advantages will be apparent to those skilled in the art upon reading the accompanying specification and claims.

*Example I*

The composition of the fuel of the present invention is as follows:

85 to 95 percent by weight butadiene. It is immaterial whether it is 1,2- or 1,3-butadiene, or a mixture thereof. Commercial butadiene is over 90 percent 1,3.

5 to 15 percent $C_2$ to $C_4$ paraffins and/or olefins; namely, ethane, ethylene, propane, propylene, isobutane, isobutylene, butene-1, n-butane, trans butene-2, and cis butene-2.

0 to 5 percent acetylene, propadiene, methyl acetylene, ethyl acetylene, vinyl acetylene, butatriene and diacetylene.

In the present invention, this novel composition of matter of the preceding paragraphs is useful for a welding and cutting torch fuel and is mixed and stored in a steel cylinder for six months without sufficient polymerization to give any difficulties in its use as a fuel. An attempt to store 99 percent butadiene in a similar cylinder for a similar time results in the formation in about four months of sufficient solid popcorn polymer and rubbery polymer to cause trouble in its use for welding and cutting due to partial plugging of the narrow passages in the torch.

If the fuel selected remains liquid and has too low a vapor pressure at the temperature and pressure it is to be used in the torch, a torch with a conventional heated vaporizing chamber, or vaporizing equipment, can be employed, there being many such available in the prior art. If desired, pressure can be applied to the liquid fuel, as in the conventional blow torch of the prior art, or a suitable weight percentage of $C_2$ and/or $C_3$ paraffins and/or olefins added in the 5 to 15 percent by weight of $C_2$ to $C_4$ paraffins and/or olefins specified above to increase the vapor pressure at the temperature involved to the desired pressure.

*Example II*

Six plates were cut using a conventional oxygen acetylene cutting torch using commercial grade cylinder oxygen and the following mixtures of butadiene and butene-1 at the following pressures and flow rates given in Table I. The results were in every respect comparable with the results which were obtained in similar cuts made with acetylene. The cuts in the 2-inch plate were with a #8 tip and those in the 1-inch plate with a #6 tip.

TABLE I

| Fuel [1] | | | | Oxygen | | Steel Plate | | |
|---|---|---|---|---|---|---|---|---|
| Butadiene, Weight Percent | Butene-1, Weight Percent | Pressure, p.s.i.g. | Rate, c.f.h. | Pressure, p.s.i.g. | Rate, c.f.h. | Thickness | | Rate of Cut, Inches/Min. |
| | | | | | | Inches | Angle, degs. | |
| 90 | 10 | 15 | 10 | 80 | 34 | 1 | 90 | 21.8 |
| 90 | 10 | 15 | 15 | 100 | 47 | 1 | 45 | 17 |
| 90 | 10 | 15 | 13.5 | 80 | 47 | 2 | 90 | 13 |
| 95 | 5 | 15 | 8 | 80 | 39 | 1 | 90 | 22 |
| 95 | 5 | 15 | 15 | 100 | 50 | 1 | 45 | 17 |
| 95 | 5 | 15 | 13.5 | 80 | 47 | 2 | 90 | 13 |
| Acetylene, Weight Percent. | | | | | | | | |
| 100 | | 15 | 10 | 80 | 34 | 1 | 90 | 21.8 |
| 100 | | 15 | 15 | 100 | 47 | 1 | 45 | 17 |
| 100 | | 15 | 13.5 | 80 | 47 | 2 | 90 | 13 |

[1] The butadiene-butene-1 mixtures contained 100 p.p.m. tertiary-butyl catechol.

In fact, the comparative tests in Table I show that butadiene compositions containing 5 to 10 percent by weight butene-1 gave identical results to acetylene without the danger of explosion always present with acetylene.

*Example III*

Welding tests were made with a mixture containing 85 percent by weight butadiene and 15 percent by weight butene-1 and with acetylene in which filet welds were made between two ⅛-inch mild steel plates with one plate vertical with respect to the other. A Model W-200 Purox torch with a #30 tip was used. Fuel pressure was 7-8 p.s.i.g. and oxygen pressure was 10 p.s.i.g. The weld obtained with the butadiene-containing mixture was comparable to that made with acetylene.

It should be noted that with other fuel gases, such as 100 percent propane, the conventional oxygen acetylene welding and cutting torch and tip have to be modified, but the burning of 85 to 95 percent by weight butadiene is so similar to acetylene that no change needed to be made in the torch in changing from acetylene to the fuel of the present invention.

While certain specific examples have been described above for illustrative purposes, it is believed obvious that the present invention is not limited thereto.

Having described my invention, I claim:

1. The process of welding metal parts together comprising burning a fuel consisting essentially of 85 to 95 percent by weight butadiene, 5 to 15 percent $C_2$ to $C_4$ paraffins and mono-olefins, and 0 to 5 percent $C_2$ to $C_4$ acetylenes and propadiene in a free oxygen-containing atmosphere and directing the resulting flame against the metal parts to be welded until they melt and weld together.

2. The process of welding metal parts together comprising burning a fuel consisting essentially of 85 to 95 percent by weight butadiene, 5 to 15 percent $C_2$ to $C_4$ paraffins and mono-olefins, and 0 to 5 percent $C_2$ to $C_4$ acetylenes and propadiene and 5 to 500 parts per million of a butadiene rubbery polymerization inhibitor in a free oxygen-containing atmosphere and directing the resulting flame against the metal parts to be welded until they melt and weld together.

3. The process of claim 2 in which the inhibitor is selected from the group consisting of t-butyl catechol, t-butyl hydroquinone, benzyl-p-aminophenol, tricresol, amyl-p-aminophenol, alpha-naphthol, alpha-naphthylamine, trimethylphosphine, triphenylphosphine, and nitric oxide.

4. The process of cutting metal comprising burning a fuel consisting essentially of 85 to 95 percent by weight butadiene, 5 to 15 percent $C_2$ to $C_4$ paraffins and mono-olefins, and 0 to 5 percent $C_2$ to $C_4$ acetylenes and propadiene in a flame containing an excess of free oxygen and directing said flame against the metal to be cut so that said metal is heated and oxidized and thereby cut.

5. The process of cutting metal comprising burning a fuel consisting essentially of 85 to 95 percent by weight butadiene, 5 to 15 percent $C_2$ to $C_4$ paraffins and mono-olefins, and 0 to 5 percent $C_2$ to $C_4$ acetylenes and propadiene and 5 to 500 parts per million of a butadiene rubbery polymerization inhibitor in a flame containing an excess of free oxygen and directing said flame against the metal to be cut so that said metal is heated and oxidized and thereby cut.

6. The process of claim 5 in which the inhibitor is selected from the group consisting of t-butyl catechol, t-butyl hydroquinone, benzyl-p-aminophenol, tricresol, amyl-p-aminophenol, alpha-naphthol, alpha - naphthylamine trimethylphosphine, triphenylphosphine, and nitric oxide.

References Cited

UNITED STATES PATENTS

| | | | |
|---|---|---|---|
| 2,043,212 | 6/1936 | Krauss | 29—498 |
| 2,348,931 | 5/1944 | Schulze | 260—681.5 |
| 2,389,983 | 10/1945 | Schulze et al. | 260—681.5 |
| 2,398,468 | 4/1946 | Schulze et al | 260—666.5 |
| 2,407,861 | 9/1946 | Wolk | 260—666.5 X |
| 2,415,006 | 1/1947 | Hacmuth | 260—681.5 X |
| 2,415,009 | 1/1947 | Hatch et al. | 260—666.5 X |
| 3,167,596 | 1/1965 | Joo | 260—666.5 X |
| 3,226,213 | 12/1965 | Nelson et al. | 44—52 X |

DANIEL E. WYMAN, *Primary Examiner.*

W. H. CANNON, *Assistant Examiner.*